United States Patent Office 3,140,314
Patented July 7, 1964

3,140,314
N-p-TOLUENESULFONYL-N'-β-METHYL-
SULFINYLETHYL UREA
Hans Müller, Schaffhausen, and Karl Koebel, Neuhausen, Switzerland, assignors to Cilag-Chemie Limited, Schaffhausen, Switzerland, a Swiss company
No Drawing. Filed July 5, 1961, Ser. No. 121,837
Claims priority, application Switzerland July 15, 1960
1 Claim. (Cl. 260—553)

The present invention relates to new sulfonyl ureas and to a process for the production thereof. According to the present invention, there are provided novel sulfonyl ureas of the formula AR—SO$_2$—NH—CO—NH-alkylene-Z—alkyl    (I)

wherein AR represents the phenyl radical, the aminophenyl radical, the lower alkylphenyl radical, the lower alkoxyphenyl radical or the halogenophenyl radical, and Z means the group —SO— or —SO$_2$—. There is also provided an improved process for the production of such sulfonyl ureas.

The above defined sulfonyl ureas have a blood sugar lowering effect, a diuretic and anticonvulsive effect. Certain compounds of the general Formula I inhibit the coagulation of the blood.

The sulfonyl ureas of the formula

(Ib)

have a good blood sugar lowering effect when administered perorally. In the Formula Ib R means either the group —CH$_3$— or chlorine, and alkylene and alkyl together having not more than 6 carbon atoms.

The sulfonyl ureas of the above Formula I, wherein Z represents an S atom, are known (cf. French Patent No. 1,228,810; British Patent No. 795,606; British Patent No. 794,474).

It was now found that by oxidation of the sulfur bridge an increase in effect and a diminution of the toxicity can be achieved. For instance the following 2 compounds have been subjected to a comparative examination regarding blood sugar lowering effect and toxicity (A)

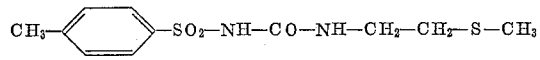

(B)

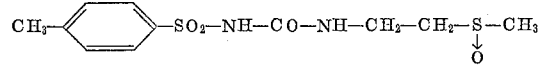

The following results were obtained:

| Toxicity | Blood sugar lowering effect in percent |
|---|---|
| A. LD$_{50}$, 5,300 mg./kg. mouse, p.o. | 21/24$^h$ |
| B. LD$_{50}$, 20,000 mg./kg. mouse, p.o. | 28/24$^h$ |

The new sulfonyl ureas of the Formula I can be obtained in the usual way, for instance by reacting a compound of the formula

AR—SO$_2$—X    (II)

with a compound of the formula

Y-alkylene-Z'-alkyl    (III)

whereby in both formulae X and Y represent a reactive radical capable of forming the urea bridge, and Z' represents either the group —SO— or —SO$_2$— or represents the S bridge; in the latter case in the urea obtained of the formula AR—SO$_2$—NH—CO—NH-alkylene-Z'-alkyl    (IV)

the S bridge Z' can be oxidized by means of usual oxidizing agents.

As already mentioned, the methods for the production of sulfonyl ureas are known to the persons skilled in the art. A very useful method for the production of sulfonyl ureas of the Formula I will be discussed in detail later on.

According to the above given schedule of reaction possibilities, for instance a sulfonyl isocyanate of the Formula II (X= —N=C=O) can be reacted with an amine of the Formula III (Y= —NH$_2$). Instead of a sulfonyl isocyanate, a sulfonyl carbamyl halide (II:X= —NH—CO-Hal), a sulfonyl carbamic acid ester, preferably an aryl ester (II:X= —NH—COO—AR), a sulfonyl urea (II:X= —NH—CO—NH$_2$) as well as a sulfonyl urea substituted in N' (II:X= —NH—CO—NH-Ac, or —NH—CO—NH—NO$_2$, or —NH—CO—NH—Ar)

can be reacted with an amine of the Formula III (Y:—NH$_2$).

There is also the reverse possibility of treating a sulfonamide of the Formula II (X= —NH$_2$) with an isocyanate of the Formula III (Y= —N=C=O). In the place of isocyanate, there may be used such substances which are capable of producing isocyanates, for instance carboxylic acid azides (Y= —CO—N$_3$, or N-halogenocarboxylic acid amides (Y= —CO—NH-Hal).

Moreover, it is possible to react a sulfonamide of the Formula II (X= —NH$_2$) with a carbamic acid halide of the Formula III (Y= —NH—CO-Hal), a carbamic acid ester (Y= —NH—COOR), an urea (Y= —NH—CO—NH$_2$)

or a nitro-urea respectively (Y= —NH—CO—NH—NO$_2$)

A further possibility is to react a sulfonyl halide of the Formula II (X=Hal) with an isourea ether of the Formula III

forming thus a sulfonyl isourea ether, which may be split by hydrolysis.

As already mentioned, the formation of the urea bridge may be achieved by means of components responding to the Formula III, in which Z' represents the groups —SO— or —SO$_2$— or —S—. In the latter case, the S group is to be oxidized after the formation of the sulfonyl urea, following the standard techniques used, for instance by means of H$_2$O$_2$ in glacial acetic acid, acetone, etc. To obtain the —SO— group, oxidation may be carried out at room temperature. To obtain the —SO$_2$— group, it is convenient to work at a slightly higher temperature.

As stated above, AR may be an aminophenyl radical. In some cases, the free amino group may disturb the formation of the urea bridge. Therefore, it is helpful to use such sulfonyl compounds

AR—SO$_2$—X which contain the NH$_2$ group in a non-salt-forming previous stage. The NH$_2$ group may then be obtained after the formation of the urea bridge; the amino group may be obtained for instance from the acylamino group or from the nitro group.

On transamidating an aminophenylsulfonyl urea unsubstituted in position N' with an amine H$_2$N-alkylene-Z-alkyl in a solvent like methyl-isopropylketone, etc., the free amino group is no impediment.

The so-called transamidation of a sulfonyl urea unsubstituted in position N' with an amine H₂N-alkylene-Z-alkyl is in fact the most convenient method for the preparation of sulfonyl ureas of the Formula I.

Surprisingly, transamidation is performed easily and with very good yields also with alkylsulfinylalkyl amines and alkylsulfonylalkyl amines. Especially when using alkylsulfonylalkyl amines, such good results were not to be expected, since the basicity of the amino group seems strongly weakened by the SO₂ group in the β- or γ-position respectively.

For this transamidation there may be used the free bases NH₂-alkylene-Z-alkyl or their salts. There are preferably used the hydrochlorides of the amines. It is advantageous to use dioxane or dimethyl formamide as solvent for the transamidation. At the beginning of the transamidation, the solvent contains a thick crystal slurry. The arylsulfonyl urea used for the transamidation dissolves readily in dioxane, whereas the hydrochlorides of the alkylsulfinylamines and of the alkylsulfonylamines are practically insoluble in dioxane. Shortly after starting the heating to 100° C., the crystal mass begins to dissolve; to the same degree to which the hydrochloride of the amine reacts, ammonium chloride is formed. Usually, a point is reached with only a slight suspension of salt in the dioxane. This point indicates that the transamidation is advanced. In the following minutes, a strong separation of ammonium chloride sets in. This indicates that the reaction is soon finished. Working in dioxane has the advantage that the progress of the reaction can be observed. The formed N-arylsulfonyl-N'-alkylsulfinylalkyl-, N'-alkylsulfonylalkyl urea respectively is readily soluble in dioxane.

In order to isolate the formed sulfonyl urea, it is possible to add water, whereby the formed ammonium chloride dissolves and the formed sulfonyl urea crystallizes; it is also possible to remove the ammonium chloride by filtration, to evaporate the filtrate, and to triturate the residue with water, whereby the sulfonyl urea crystallizes.

The best molecular ratio between sulfonyl urea and amine is 1:1.1. According to the process described above, the sulfonyl ureas in question can be obtained in a yield of approximately 95%.

The alkylsulfinylalkylamines and the alkylsulfonylalkylamines needed for the transamidation are known substances, or can be prepared by oxidation from the alkylthioalkylamines which are all described in the literature. The oxidation is performed by means of H₂O₂ in diluted hydrochloric acid according to the method of K. W. Brighton et al. [J. Am. Chem. Soc. 65, p. 459 (1943)].

*Example 1*

29 g. of N-p-toluenesulfonyl-N'-β-methylthioethyl urea, prepared by transamidation of p-tosyl urea with methylthioethylamine, are dissolved in 250 cc. of pure glacial acetic acid. 11.3 g. of 30% H₂O₂ are added under stirring and external cooling. After 2 days, the solution is concentrated in vacuo at a temperature not higher than 40° C. The residue is triturated with water, whereby crystallization sets in. The crystals are sucked off, washed with water and dried in the exsiccator. 18 g. of the desired sulfoxide of the formula

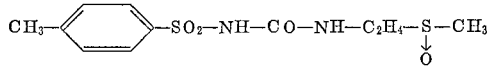

are obtained. It melts after recrystallization from abs. methanol/abs. ether at 164–165° C. (sintering point: 133–134° C.).

*Example 2*

214 g. of p-tosyl urea are suspended in 500 cc. of methylisobutylketone. 120 g. of methylmercaptoethylamine-S-sulfoxide in 500 cc. of methylisobutylketone are added and the whole is heated to boiling. After about 55 minutes, the escape of ammonia has ceased. After cooling, 1000 cc. of 1 N sodium hydroxide are added under stirring. The alkaline aqueous layer is separated and buffered with acetic acid. 15–20 g. of p-toluenesulfonamide precipitates and is removed by filtration. The filtrate is filtered with charcoal and then acidified with hydrochloric acid. The precipitated sulfoxide of the formula

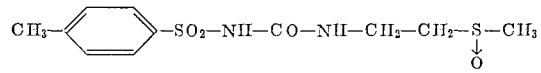

is washed with water. The sulfoxide melts after recrystallization from methylethylketone at 164–165° C. under decomposition (sintering point: 137° C.). It dissolves readily in cold aqueous NaHCO₃ solution, glacial acetic acid and methanol, hot acetonitrile, methylethylketone and acetone. 150 g. of pure product are obtained.

*Example 3*

In the same manner as described in the foregoing example, p-tosyl urea can be reacted with β-methyl-sulfinylamine in nitrobenzene as solvent. In order to facilitate the escape of ammonia, a readily volatile solvent is added to nitrobenzene, for instance methylenechloride. The temperature for the transamidation should be kept at 105–110° C. The sulfoxide is obtained in a yield of 85% of the theoretical value.

*Example 4*

16 g. of β-methylsulfonylethylamine-hydrochloride and 21.7 g. of p-tosylisocyanate in 50 cc. of acetonitrile are heated to boiling. The escape of gaseous hydrochloric acid ceases after 45 minutes, and a clear solution results. The whole is cooled and 150 cc. of water are added under stirring. The solution is buffered by means of aqueous ammonium hydroxide. The precipitate is sucked off and washed well with a mixture of acetonitrile/water. After recrystallization from acetonitrile, 24.6 g. of N-p-tosyl-N'-(β-methylsulfonylethyl)-urea are obtained corresponding to 77% of the theoretical value.

The new sulfonyl urea melts at 173–174° C.; it is readily soluble in aqueous sodium bicarbonate solution.

*Example 5*

43 g. of p-tosyl urea and 33.5 g. of β-methylsulfonylethylamine hydrochloride in 100 cc. of dioxane are heated in an oil bath under stirring. At a temperature of 100° C. the thick slurry dissolves in part and the formed ammonium chloride precipitates. The temperature is kept at 97–100° C. for 25 minutes. After cooling, 200 cc. of water is added under stirring, whereby the ammonium crystals dissolve. After a short time, the sulfonyl urea formed precipitates. 61 g. of the desired product are obtained, which yield corresponds to 95% of the theoretical value.

*Example 6*

357 g. of p-tosyl urea and 289 g. of β-ethylsulfinylethylamine hydrochloride in 2000 cc. of dioxane are stirred for 40 minutes at 100° C. Subsequently the ammonium chloride formed is sucked off and the filtrate evaporated in vacuo. The sulfonyl urea formed appears as an oil. It is dissolved in 2000 cc. of N sodium hydroxide, the solution filtered with charcoal and the filtrate adjusted to a pH value of 4 by means of diluted hydrochloric acid. The precipitated sulfonyl urea is filtered with suction, washed and dried. After recrystallization from a mixture of methylisobutylketone/dioxane, 400 g. of the new sulfonyl urea of the formula

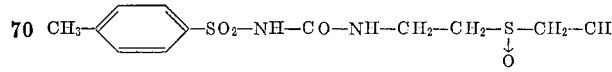

are obtained. The new sulfonyl urea melts at 142° C.; it is readily soluble in dioxane and in diluted aqueous NaHCO₃ solution.

Example 7

279 g. of p-tosyl urea and 248 g. of γ-methylsulfonylpropylamine hydrochloride in 800 cc. of dioxane are stirred for 10–15 minutes at 100° C. Working-up is performed in a manner analogous to that described in the Example 5. After recrystallization from acetone/cyclohexane, 390 g. of the new sulfonyl urea are obtained, melting at 140° C.

The new sulfonyl urea has the formula

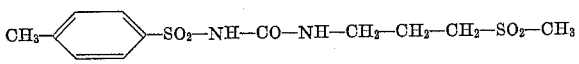

It dissolves readily in dioxane, acetone and in aqueous NaHCO₃ solution, but is little soluble in water.

Example 8

In a manner analogous to that described in the foregoing examples, there is obtained the sulfonyl urea of the formula

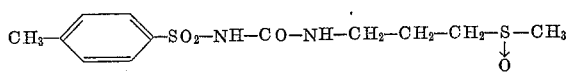

This new sulfonyl urea is obtained as an amorphous powder of an unsharp melting point of 120–160° C.

Example 9

214 g. of p-tosyl urea and 191 g. of β-ethylsulfonylethylamine hydrochloride in 550 cc. of dioxane are heated to 100–102° C. for 25 minutes. After working up as described in Example 5, 315 g. of the sulfonyl urea of the formula

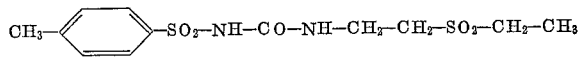

are obtained. This yield corresponds to 94% of the theoretical value.

After recrystallization from a 1:1 mixture of methylisobutylketone/cyclohexane, the new sulfonyl urea melts at 126–127° C.

Example 10

23. 9 g. of β-methylsulfinylethylamine-hydrochloride are suspended in 50 cc. of dimethylformamide. 35.2 g. of p-chlorophenylsulfonyl urea are added and the whole heated to 100° C. under stirring. After a short time, the solution becomes clear, separation of ammonium chloride starts after 6 minutes; the reaction is finished after 15 minutes. The reaction mass is cooled, 300 cc. of water are added while stirring, whereby the formed sulfonyl urea separates in form of grainy crystals. After recrystallization from dioxane/ethylacetate, there are obtained 37 g. of N-p-chlorophenylsulfonyl-N′-β-methylsulfinylethyl urea, melting at 171–172° C. under decomposition.

Example 11

17.5 g. of β-methylsulfonylethylamine-hydrochloride and 21.5 g. of sulfanilyl urea are heated for 10 minutes to 100–103° C. in dioxane. Working-up is carried out as described in the foregoing examples. 20 g. of N-sulfanilyl-N′-β-methylsulfonylethyl urea, melting at 158–161° C. under decomposition, are obtained. The new urea dissolves readily in diluted aqueous NaHCO₃ solution.

In an analogous manner as described in the foregoing examples, there is obtained:

N-sulfanilyl-N′-β-methylsulfinylethyl urea;
M.P.: 145° C. dec.

What we claim is:
The compound of the formula

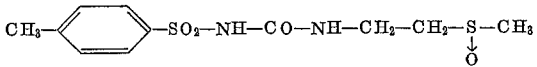

References Cited in the file of this patent

UNITED STATES PATENTS

| | | |
|---|---|---|
| 2,734,905 | Zima et al. | Feb. 14, 1956 |
| 2,933,496 | Heinzelman et al. | Apr. 19, 1960 |
| 2,958,692 | Schroeder | Nov. 1, 1960 |
| 3,005,022 | McLamore | Oct. 17, 1961 |

FOREIGN PATENTS

| | | |
|---|---|---|
| 919,464 | France | Nov. 25, 1946 |
| 559,530 | Belgium | Oct. 14, 1957 |
| 824,218 | Great Britain | Nov. 25, 1959 |